United States Patent [19]

Ilk et al.

[11] 4,321,075

[45] Mar. 23, 1982

[54] SKIMMING APPARATUS

[76] Inventors: Emil Ilk, Ahornweg 4, 8372 Zwiesel; Helmut Sorg, Im Himbeergrund 27, 8752 Johannesberg, both of Fed. Rep. of Germany

[21] Appl. No.: 176,380

[22] Filed: Aug. 8, 1980

[30] Foreign Application Priority Data

Aug. 9, 1979 [DE] Fed. Rep. of Germany ....... 2932282

[51] Int. Cl.³ .................................................. C03B 5/2
[52] U.S. Cl. ......................................... 65/27; 65/134; 65/168; 65/182.3; 65/206
[58] Field of Search .................... 65/206, 168, 134, 27, 65/335, 182.3

[56] References Cited

U.S. PATENT DOCUMENTS

| | | | |
|---|---|---|---|
| 1,414,008 | 4/1922 | Brown | 65/134 |
| 1,903,223 | 3/1933 | McNish | 65/168 |
| 3,653,869 | 4/1972 | Biagini | 65/206 X |
| 3,771,986 | 11/1973 | Stultz | 65/168 X |
| 4,195,981 | 4/1980 | Penberthy | 65/134 |

Primary Examiner—Arthur D. Kellogg
Attorney, Agent, or Firm—Fitch, Even, Tabin, Flannery & Welsh

[57] ABSTRACT

A process and apparatus for skimming the surface of molten glass in a tank to produce a portion thereof free of contamination includes driving a substantially horizontally disposed strut connected to a scraper arm so as to pivot the strut to raise the scraper arm for horizontal movement above the glass surface, pivot the strut to effect vertical movement of the scraper arm to immerse the arm in the melt, retract the strut to horizontally move the arm while immersed to effect skimming and thereafter simultaneously pivoting and retracting the strut to effect both vertical and horizontal movement of the arm.

3 Claims, 2 Drawing Figures

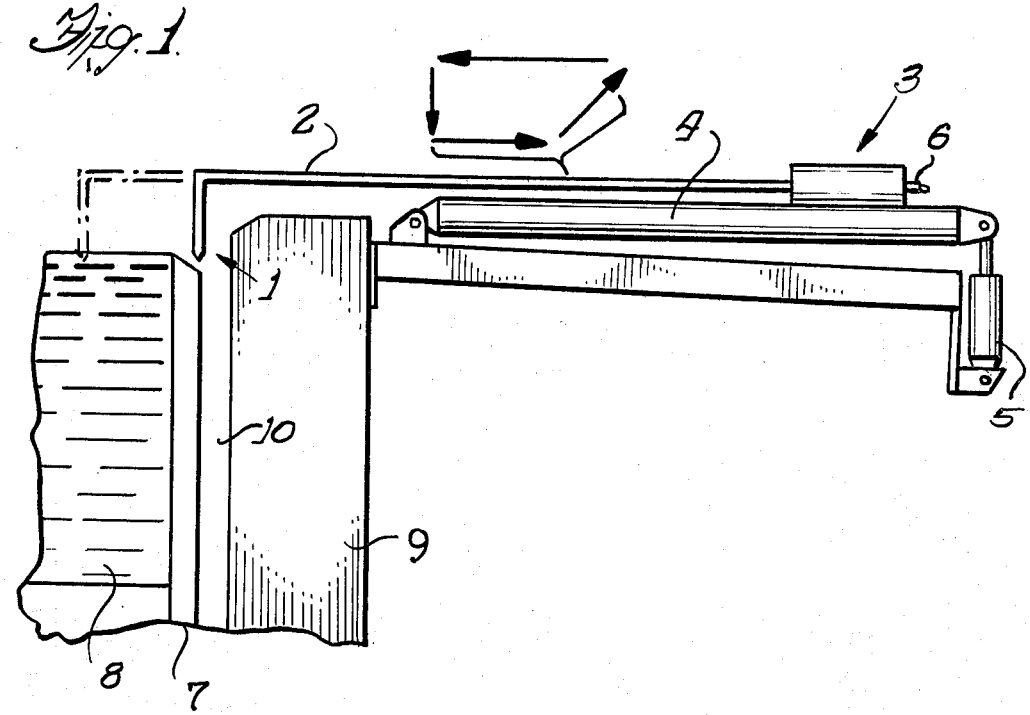
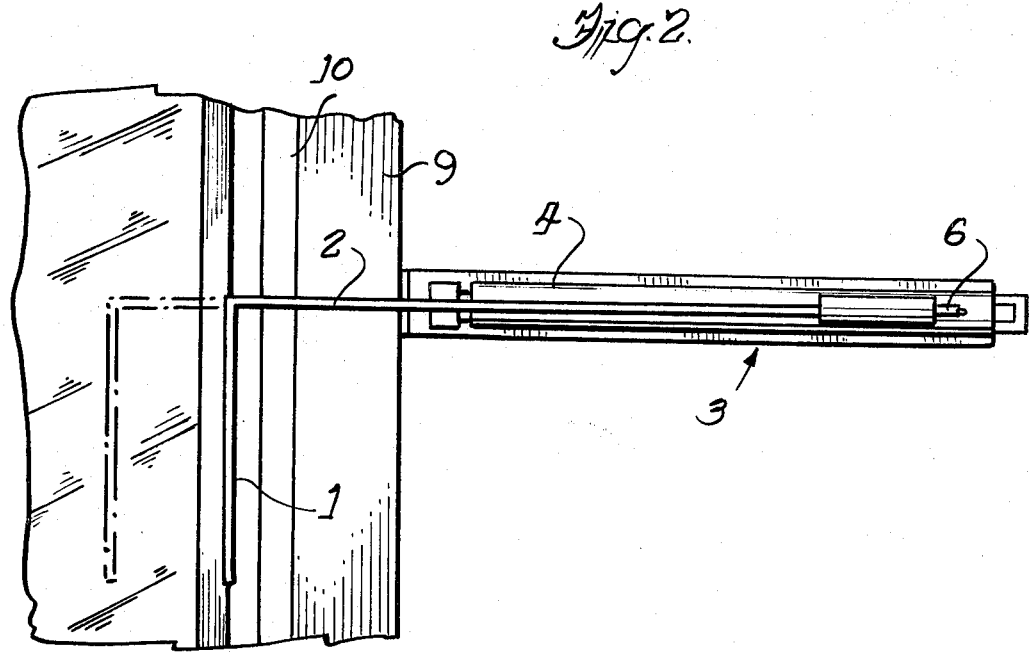

SKIMMING APPARATUS

BACKGROUND OF THE INVENTION

The present invention relates to a skimming apparatus comprising a movable scraper arm for a glass tank, wherein said scraper arm traverses across the surface of the molten glass mass to produce a portion thereof free from contamination.

The surface of a molten glass mass (glass melt) in a processing tank frequently shows non-homogeneities and impurities which aggravate or even prevent the production of high quality glass articles. These defects are due to the fact that, on the one hand, air bubbles may enter the melt during the withdrawal of glass lumps, and, on the other hand, in the case of specific types of glass the upper layer of the melt assumes a composition different from that of the major part of the molten mass, by evaporation of volatile components.

Laid-open German patent application Ser. No. 2,711,811 discloses a feeder apparatus wherein, in order to obtain a homogeneous surface layer free from contaminants, the surface of the glass bath or mass is scraped off by a skimmer or scraper arm before a lump is taken out. The lateral edge of the feeder is aligned with the surface of the molten glass mass, and the skimming arm pushes the surface layer of the molten glass across this edge.

In the conventional feeder apparatus, the skimmer or scraper arm is mounted to a rotatable shaft being disposed adjacent to the feeder. This results in the drawback that the rotating skimmer arm requires much installation space. Particularly when the glass lumps are withdrawn manually, the rotating skimmer arm is dangerous to the operators, too. A particularly serious disadvantage of the conventional apparatus resides in the fact that the skimmer arm is not adapted to be immersed into glass melt to a sufficient depth, because this arm rotates above the wall defining the feeder. A skimmer or scraper arm which rotates above the surface of the glass melt exclusively without traversing the wall, however, would not be adapted to adequately remove the upper layer of the molten glass mass from the glass tank. Still further, the conventional skimmer arm, owing to its vertically positioned axis, cannot be operated through the laterally positioned openings which are anyhow present in feeders for the removal of glass lumps.

SUMMARY OF THE INVENTION

It is the object of the present invention to avoid these drawbacks of the prior art by providing a skimming apparatus of the type as outlined above, which apparatus, while requiring less installation space, provides for effective removal of non-homogeneities and contaminations from the surface of the molten glass mass. In this apparatus, the skimmer or scraper arm should be adapted to be moved substantially above the molten glass mass so as to avoid any danger to the operators standing in the vicinity of the glass tank.

Further, the scraper arm should be adapted to be immersed into the glass melt to a sufficient depth in order to remove the contaminated surface layer. Finally, the skimming device should be adapted to be operated through the discharge openings provided in processing tanks.

According to the present invention, the above mentioned object is solved in that the scraper arm is mounted to a substantially horizontally disposed strut, said strut forming part of a driving mechanism producing linear thrust movement, and that said scraper arm is adapted to be lifted together with said strut.

Advantageously, the driving mechanism comprises essentially a hydraulic or pneumatic device.

In a preferable embodiment, the driving mechanism comprises an advancing cylinder/piston assembly adapted to be rotated about a pivot point arranged adjacent said glass tank and adapted to produce horizontal movement, and a lifting cylinder/piston assembly for vertical movement.

Still further, the driving mechanism may comprise a cam disc along which the end of the strut rides with positive guiding contact. Also, this mechanism may comprise a rack and gear transmission assembly.

Advantageously, subsequent to the glass tank there is provided a glass pocket having an external insulation layer and serving to receive the scraped off glass. The insulation layer prevents excessive cooling of the scraped off glass melt which, otherwise, would solidify instead of flowing away.

Preferably, the skimming apparatus includes a foot switch for initiating one scraping operation at a time.

In order to reduce the thermal stress on the scraper arm, this arm is preferably provided with a continuous pipe system for passing a cooling medium therethrough.

The present method of operating the skimming apparatus is characterized in that the sequence of motion of the scraper arm is composed of the following steps:

with the end of strut lowered, the scraper arm is advanced;

by raising the end of strut, the scraper arm is lowered onto the surface of the molten glass mass until it is slightly immersed into the latter;

the scraper arm is retracted towards the edge of glass tank; and upon reaching the marginal portion of the glass tank, the scraper arm is lifted by lowering the end of the strut, while the scraper arm is simultaneously further retracted across the edge of the glass tank.

Below, an exemplary embodiment of the present invention is explained in greater detail by referring to the drawing, wherein:

BRIEF DESCRIPTION OF THE DRAWING

FIG. 1 shows a side elevational view of the skimming apparatus according to the invention; and FIG. 2 is a plan view of the skimming apparatus according to FIG. 1.

DETAILED DESCRIPTION OF THE INVENTION

The skimming apparatus comprises essentially a scraper arm 1 mounted to a substantially horizontally positioned strut 2, and a driving mechanism 3 producing a linear thrust motion. The driving mechanism 3 is a hydraulic device comprising an advancing cylinder/piston assembly 4 and a lifting or raising cylinder:piston assembly 5, which assemblies are articulated to each other. The advancing cylinder:piston assembly is pivotable on a fulcrum disposed closely adjacent to the glass tank 7. In this way, the scraper arm 1 is adapted to be moved both in horizontal and vertical direction. By means of a cooling water connection 6, cooling water may be conducted through strut 2 and scraper arm 1.

The lateral edge of glass tank 7 is aligned with the surface of the molten glass mass 8. In front of the glass tank 7 and spaced therefrom, a wall 9 forming a protective shield and being equipped with an insulation layer is provided. In this way, a glass pocket 10 is formed between the glass tank 7 and wall 9, which glass pocket receives the scraped off or skimmed glass (melt). The insulation layer prevents the glass in the glass pocket 10 from excessive cooling.

The skimming apparatus operates as follows: The driving mechanism 3 advances the scraper arm 1, with the end of strut 2 lowered, across the surface of the glass melt 8, and the scraper arm is thereafter lowered so as to be slightly immersed into the glass melt 8. The advancing cylinder 4 then moves the scraper arm horizontally to the edge of the glass tank 7, so as to scrape of the surface layer of the glass melt 8. The glass which is in this way pushed to the tank edge, flows into the glass pocket 10 and may be collected in the latter to be transferred for further processing. When the edge portion of the tank is reached, the scraper arm is raised by lowering the end of strut 2, and the scraper arm is simultaneously further retracted across the tank edge until the arm is returned into its original position. This operation is repeated prior to removal of each glass lump, such that there is always available a surface portion free of non-homogeneities and contaminations for the removal of glass melt. Operation may be initiated by means of a non-illustrated foot (operated) switch.

The skimming apparatus according to the invention provides for the effective removal of non-homogeneities and contaminations from the surface of the glass melt, while requiring little installation space. Owing to the fact that the scraper arm moves substantially above the glass tank only, a high degree of safety for the operators working in the vicinity of the glass tank is ensured. The driving mechanism produces a sequence of motions by which sufficiently deep immersion of the scraper arm is provided. A particular advantage of the skimming apparatus may be seen in the fact that this apparatus may be operated through the discharge openings which are provided anyhow in glass (melting) tanks. Thus, modifications of the glass melting furnace are not required. The skimming apparatus may be constructed as a transportable device which may be employed for a plurality of glass melting furnaces. Also, this apparatus may be readily removed from the glass tank during pauses of operation, such that the glass tank may be closed by means of a cover in order to minimize cooling of the molten glass. Accordingly, it may be spoken of an excellent solution to the existing problems.

What we claim is

1. An apparatus for skimming the surface of molten glass in a tank to produce a portion thereof, free of contamination, comprising: a scraper arm; a substantially horizontally disposed strut connected to the scraper arm; a substantially horizontal first cylinder means connected to the strut for effecting horizontal movement of the scraper arm above the glass surface to position same, means pivotally mounting an end of said first cylinder means adjacent the tank, a second cylinder means joined to the other end of said first cylinder means for pivoting said first cylinder means about said pivot means to effect vertical movement to immerse the arm into or lift the arm from the melt; said first cylinder means effecting horizontal movement of the arm while immersed to effect skimming, said first and second cylinders effecting simultaneous vertical and horizontal movement of the arm to retract same from the tank.

2. An apparatus in accordance with claim 1 in which said second cylinder means is disposed vertically, a second pivot means pivotally joining said second cylinder means to said other end of said first cylinder means.

3. A method of skimming contaminants from a surface of glass in a tank by a scraper arm movable by a first cylinder means in a horizontal direction, and a second cylinder means connected to a remote end of the first cylinder means for pivoting the latter about an end thereof adjacent the glass tank, said method comprising the steps of:

providing a scraper arm and substantially horizontally disposed strut connected thereto;

lowering a remote end of the strut and cylinder means to raise the scraper arm above the surfaces and advancing same horizontally;

raising the remote end of the first cylinder means and the strut to lower the scraper arm onto the surface of the molten glass mass until it is slightly immersed into the latter;

retracting the scraper arm towards an edge of glass tank; and upon reaching a marginal portion of the glass tank raising the scraper arm by lowering the remote end of said cylinder means and strut while the scraper arm is simultaneously further retracted across the edge of the glass tank.

* * * * *